US00RE44974E

(19) United States
(12) Reissued Patent
Lee et al.

(10) Patent Number: US RE44,974 E
(45) Date of Reissued Patent: Jul. 1, 2014

(54) KEYPAD ASSEMBLY

(71) Applicant: Samsung Electronics Co., Ltd., Gyeonggi-do (KR)

(72) Inventors: Yu-Sheop Lee, Gyeonggi-do (KR); Sun-Tae Jung, Gyeonggi-do (KR); Joo-Hoon Lee, Gyeonggi-do (KR)

(73) Assignee: Samsung Electronics Co., Ltd., Yeongtong-gu, Suwon-si, Gyeonggi-do (KR)

(21) Appl. No.: 13/670,756

(22) Filed: Nov. 7, 2012

Related U.S. Patent Documents

Reissue of:

(64) Patent No.: 7,947,915
Issued: May 24, 2011
Appl. No.: 12/041,718
Filed: Mar. 4, 2008

(30) Foreign Application Priority Data

Mar. 29, 2007 (KR) ..... 10-2007-0031187

(51) Int. Cl.
*H01H 9/00* (2006.01)

(52) U.S. Cl.
USPC ..... 200/314; 200/308

(58) Field of Classification Search
USPC ..... 200/308, 310–314; 341/20, 22, 23; 345/168–170; 379/368, 433.07, 379/433.01; 455/90.3, 566, 575.1, 575.3, 455/575.4, 575.9
See application file for complete search history.

(56) References Cited

U.S. PATENT DOCUMENTS

| | | | |
|---|---|---|---|
| 7,005,595 | B1 | 2/2006 | Tang |
| 7,244,899 | B2 | 7/2007 | Jung et al. |
| 7,411,142 | B2 | 8/2008 | Jung et al. |
| 2007/0205088 | A1 | 9/2007 | Lee et al. |

FOREIGN PATENT DOCUMENTS

| | | | |
|---|---|---|---|
| CN | 1272922 | | 11/2000 |
| CN | 1272922 | A | 11/2000 |
| CN | 1862732 | | 11/2006 |
| CN | 1862732 | A | 11/2006 |
| CN | 1866437 | | 11/2006 |
| CN | 1866437 | A | 11/2006 |
| CN | 1866438 | | 11/2006 |
| CN | 1866438 | A | 11/2006 |
| EP | 1722385 | | 11/2006 |
| EP | 1722385 | A1 | 11/2006 |
| EP | 1724800 | | 11/2006 |
| EP | 1724800 | A1 | 11/2006 |
| JP | 10-334718 | | 12/1998 |
| JP | 10-334718 | A | 12/1998 |
| JP | 2000-162594 | A | 6/2000 |
| JP | 2004-069751 | A | 3/2004 |
| JP | 2006-059583 | A | 3/2006 |
| JP | 2006-318905 | A | 11/2006 |
| JP | 2006-323843 | A | 11/2006 |
| JP | 2006-324240 | A | 11/2006 |
| JP | 2006-324253 | A | 11/2006 |
| JP | 2007-027115 | A | 2/2007 |

(Continued)

*Primary Examiner* — Edwin A. Leon
(74) *Attorney, Agent, or Firm* — Cha & Reiter, LLC.

(57) ABSTRACT

Disclosed is a keypad assembly including a light guide panel, light, at least one light extracting pattern provided on the light guide panel so that light propagating inside the light guide panel is directed out of the light guide panel, a switch board having at least one switch; and at least one light source for coupling light to the inside of the light guide panel, wherein the light guide panel has a thickness of 0.03-0.6 mm.

27 Claims, 5 Drawing Sheets

(56) References Cited

FOREIGN PATENT DOCUMENTS

| | | | |
|---|---|---|---|
| JP | 2007-53063 | A | 3/2007 |
| KR | 10-2006-0120512 | A | 11/2006 |
| KR | 2006-120512 | | 11/2006 |
| KR | 10-695020 | | 3/2007 |
| KR | 10-0695020 | B1 | 3/2007 |
| WO | WO 99/63394 | | 12/1999 |
| WO | WO 99/63394 | A1 | 12/1999 |
| WO | WO2005/107363 | | 11/2005 |
| WO | WO 2005-107363 | A2 | 11/2005 |

KEYPAD ASSEMBLY

Matter enclosed in heavy brackets [ ] appears in the original patent but forms no part of this reissue specification; matter printed in italics indicates the additions made by reissue.

CLAIM OF PRIORITY

This application claims the benefit of the earlier filing date, pursuant to 35 USC §119, to that patent application entitled "Keypad Assembly" filed with the Korean Intellectual Property Office on Mar. 29, 2007 and assigned Serial No. 2007-31187, the contents of which are incorporated herein by reference.

BACKGROUND OF THE INVENTION

1. Field of the Invention

The present invention relates to a keypad assembly and more particularly to a keypad having a light guide panel and a keypad assembly.

2. Description of the Related Art

FIG. 1 is a sectional view of a first exemplary keypad assembly according to the prior art. The keypad assembly 100 includes a keypad 110, a switch board 150, and a plurality of light emitting diodes (LEDs) 170.

The keypad 110 includes an elastic pad 120, a plurality of key buttons 140 having characters, symbols, letter, etc., formed on their upper surface and lying on the upper surface 122 of the elastic pad 120, and a plurality of protrusions 130 formed on the lower surface 124 of the elastic pad 120. Respective key buttons 140 are aligned with corresponding protrusions 130 and switches 160 in the transverse direction of the keypad assembly 100. The elastic pad 120 has a plurality of grooves 126 formed on its lower surface 124 around respective protrusions 130 to prevent the LEDs 170 and the protrusions 130 from interfering with each other.

The switch board 150 has a printed circuit board (PCB) 155 and a plurality of switches 160 formed on the upper surface of the PCB 155, which faces the keypad 110. Each switch 160 consists of a conductive contact member 162 and a conductive dome 164 completely covering the contact member 162.

The LEDs 170 are mounted on the upper surface of the PCB 155 and are positioned in such a manner that they are covered with corresponding grooves 126 of the elastic pad 120.

If the user presses one of the key buttons 140, a portion of the keypad 110 lying beneath the pressed key button 140 is deformed towards the switch board 150. As a result, a protrusion 130 belonging to the deformed portion compresses the corresponding dome 164, which then makes an electric contact with the corresponding contact member 162.

FIG. 2 is a sectional view of a second exemplary keypad assembly according to the prior art. The keypad assembly 200 includes a keypad 210, an electroluminescence sheet 260, a switch board 250, and a driving unit 280.

The keypad 210 includes an elastic pad 220, a plurality of key buttons 230 having characters, etc. formed on their upper surface, and lying on the upper surface of the elastic pad 220, and a plurality of protrusions 240 formed on the lower surface of the elastic pad 220. Respective key buttons 230 are aligned with corresponding protrusions 240 and switches 270 in the transverse direction of the keypad assembly 200.

The switch board 250 has a PCB 255 and a plurality of switches 270 formed on the upper surface of the PCB 255.

Each switch 270 consists of a conductive contact member 272 and a conductive dome 274 completely covering the contact member 272.

The electroluminescence sheet 260 is positioned to cover the upper surface of the PCB 255 with the switches 270 interposed between them, and emits light in response to an applied driving signal.

The driving unit 280 is mounted on the upper surface of the PCB 255 while being positioned on one side of the electroluminescence sheet 260, and applies a driving signal to the electroluminescence sheet 260.

However, the above-mentioned keypad assemblies 100 and 200 have the following problems.

In the case of the first exemplary keypad assembly 100, light emitted by respective LEDs 170 passes through the elastic pad 120 and reaches corresponding key buttons 140 at an oblique angle. As a result, illumination of the key buttons 140 is uneven and insufficient. More particularly, the center of each key button 140 appears darker than its periphery. However, use of more LEDs for even and sufficient illumination of the key buttons 140 makes the construction complicated and increases the power consumption and manufacturing cost.

The second exemplary keypad assembly 200 provides much less sufficient illumination than the first example.

Therefore, it is requested to provide a keypad assembly providing even and sufficient illumination, consuming less power, and having simple construction.

SUMMARY OF THE INVENTION

In an aspect of the present invention a keypad assembly providing even and sufficient illumination, consuming less power, and having simple construction is described.

In order to accomplish this aspect of the present invention, there is provided a keypad assembly including a light guide panel with light propagating inside the light guide panel, at least one light extracting pattern provided on the light guide panel so that light propagating inside the light guide panel is directed out of the light guide panel, a switch board having at least one switch and at least one light source for coupling light to the inside of the light guide panel, wherein the light guide panel has a thickness in the range of 0.03-0.6 mm.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Exemplary embodiments of the present invention are described in detail with reference to the accompanying drawings. In the following description of the present invention, a detailed description of known functions and configurations incorporated herein is omitted to avoid making the subject matter of the present invention unclear.

Figure 3:
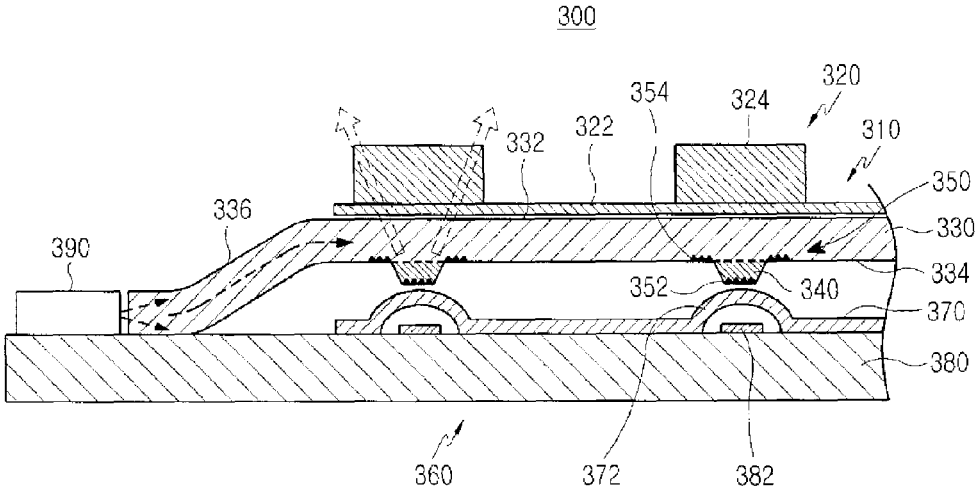
FIG. 3 shows the construction of a keypad assembly according to a first exemplary embodiment of the present invention.

FIG. 3 illustrates the construction of a keypad assembly according to a first exemplary embodiment of the present invention. The keypad assembly 300 includes a keypad 310, a switch board 360, and at least one light source 390.

The keypad 310 includes a key sheet 320 and an LGP (light guide panel) 330. The key sheet 320 includes a film 322 and a plurality of key buttons 324. The LGP 330 includes a plurality of protrusions 340 and a plurality of light extracting patterns 350.

The film 322 may have any shape (e.g. square plate), and has a plurality of key buttons 324 positioned on its upper surface. The film 322 has elasticity so that, when the key buttons 324 are pressed by the user, they can return to their original positions. In other words, the self-restoring properties of the film 322 guarantee that the key buttons 324 regain their original shapes after being deformed. In order to avoid light leakage, a portion of the upper surface of the film 322, on which no key buttons 324 are placed, may be either covered with a housing (e.g. housing of a portable wireless terminal) or printed with black ink. The film 322 is fixed at a distance from the LGP 330 in order to maintain an air layer between itself and the LGP 330. For example, the edge of the film 322 may be attached to the edge of the LGP 330 by an adhesive. This prevents light from leaking out of the center of the LGP 330. Light undergoes total reflection at the interface between the LGP 330 and the air layer. If the condition of total reflection is not satisfied at the interface between the LGP 330 and the adhesive, light may leak unnecessarily. Considering that a portion of light is directed to the key buttons 324 and the remaining portion reaches the edge of the LGP 330, the edge of the LGP 330 is preferably attached to that of the film 322. If the center of the film 322, on which the key buttons 324 are placed, attaches to the upper surface of the LGP 330, no air layer is maintained between it and the LGP 330. Therefore, the film 322 has such surface properties that it does not attach to the upper surface of the LGP 330. To this end, the lower surface of the film 322 may be either roughened or coated with a releasing agent so that it is easily detached from the LGP 330. A roughened surface has smaller contact area than that of a not-roughened surface so that the roughened surface is more easily detached from the LGP 330 than the not-roughened surface. The film 322 may be made of highly transparent rubber having low hardness, high elastic deformability, high elastic restoration properties, and high optical transmittance. Preferably, the film is made of polyurethane or silicone.

According to an alternative embodiment, the film 322 may be fastened or attached to the entire upper surface of the LGP 330. In this case, the refractive index of the film 322 or the adhesive may be lower than that of the LGP 330.

The key buttons 324 are positioned on the upper surface of the film 322. Particularly, the key buttons 324 may be attached to the upper surface of the film 322 by an adhesive. Alternatively, the key buttons 324 may be formed as an integral unit with the film 322 through injection molding, for example. Respective key buttons 324 may be made of the same material as the film 322. Alternatively, the key buttons 324 are made of polycarbonate or acryl-based resin. Although the key buttons 324 have the shape of square blocks, they may have other shapes, including circular posts and elliptical posts. It is also possible to remove the film 322 and to attach the key buttons 324 directly to the upper surface of the LGP 330.

According to an alternative embodiment, the LGP 330 may incorporate the function of the film 322, which may be removed. In this case, the key buttons 324 may be directly attached to the upper surface of the LGP 330, which enables the key buttons 324 to return to their original positions after being pressed by the user. For example, the LGP 330 consists of a conductive film having both surfaces coated with a material having a lower refractive index so that light is guided stably regardless of the varying external environment.

The LGP 330 may have any shape (e.g. square plate), and its upper surface 322 is positioned to face the lower surface of the film 322. A peripheral portion 336 of the LGP 330 bends and extends to the upper surface of a PCB 380 so that it is optically connected with the light source 390, as shown in the drawing.

The light source 390 is mounted on the upper surface of the PCB 380 in such a manner that its light emitting surface faces the first lateral surface of the peripheral portion 336 of the LGP 330. Light emitted by the light source 390 is coupled to the inside of the LGP 330 via its first lateral surface. The light source 390 may consist of a conventional LED.

The LGP 330 guides light coupled to its inside. The coupled light propagates from the first lateral surface of the LGP 330 to its second lateral surface lying opposite the first lateral surface. As used herein, the first lateral surface of the LGP 330 refers to one of lateral surfaces to which light from the light source 390 is coupled. Once coupled to the inside of the LGP 330, light undergoes total reflection at the interface between the LGP 330 and its external air layer and propagates inside the LGP 330. The LGP 330 has elasticity (i.e. self-restoring properties) so that, after being deformed by an operation of the key buttons 324, it can regain its original shape. The LGP 330 may be made of a material having lower hardness, high elastic deformability, high elastic restoration properties, and high optical transmittance. Preferably, the LGP 330 is made of polycarbonate, polyurethane, PMMA (polymethylmethacrylate), or silicone material.

The protrusions 340 are formed on the lower surface 334 of the LGP 330. The protrusions 340 may be formed as an integral unit with the LGP 330 by using the same or different material. Alternatively, the protrusions 340 are separately formed and then attached to the lower surface 334 of the LGP 330. Respective protrusions 340 may have any shape (e.g. truncated cones, trapezoidal hexahedra). The protrusions 340 are aligned with corresponding key buttons 324 in the transverse direction of the keypad assembly 300.

The LGP 330 has a plurality of light extracting patterns 350 for extracting a portion of light, which propagates inside the LGP 330, and then out of the LGP 330 so that the light is incident on corresponding key buttons 324. Respective light extracting patterns 350 are aligned with corresponding key buttons 324 in the transverse direction of the keypad assembly 300. The central portion 352 of each light extracting pattern 350 is formed on the lower surface of the corresponding protrusion 340, and the peripheral portion 354 thereof is formed around the protrusion 340. That is, the central portion 352 of each light extracting pattern 350 is formed on the lower surface of the corresponding protrusion 340 from the spectator's point of view. The light extracting patterns 350 may also be formed on the upper surface 332 of the LGP 330. Alternatively, the central portion of each light extracting pattern 350 is not formed on the lower surface of each protrusion 340, but between the LGP 330 and the protrusion 340.

The light extracting patterns 350 may consist of at least one V-shaped elements formed on the upper surface of the LGP 330, i.e. indentations or protrusions having a V-shaped cross section. Alternatively, the light extracting patterns 350 may consist of a plurality of indentations or protrusions having the shape of pyramids. When the light extracting patterns 350 are V-shaped elements, they may extend from a lateral surface of the LGP 330 to another lateral surface lying opposite it. The V-shaped elements may have the shape of saw teeth, that may be varied according to design requirements.

In addition, if necessary, the light extracting patterns 350 may be indentations formed on the upper surface of the LGP 330 in various shapes, or a plurality of protrusions formed on the same. For example, the light extracting patterns 350 may consist of a plurality of indentations or protrusions, each of which has the shape of a semi-sphere, a triangular pyramid, etc. If necessary, the light extracting patterns 350 may be reflecting or scattering patterns formed by scratching or printing.

Each light extraction pattern 350 extracts a portion of light, which propagates inside the LGP 330 and then out of the LGP 330 so that the light is incident on the corresponding key button 324. When the light extracting patterns 350 are formed on the lower surface of the LGP 330, as shown, they reflect at least a portion of incident light towards corresponding key buttons 324. This reflection may be mirror reflection or scattering (diffuse) reflection. If necessary, the light extracting patterns 350 may be formed on the upper surface 332 of the LGP 330. In this case, the light extracting patterns 350 scatter and transmit incident light towards corresponding key buttons 324. As shown, light propagating inside the LGP 330 after total reflection is incident on the light extracting patterns 350, and the majority of light reflected towards the key buttons 324 by the light extracting patterns 350 propagates to the outside through the LGP 330 and the key sheet 320 because it fails to satisfy the condition of total reflection (i.e. the incident angle is smaller than the critical angle). In addition, both light undergoing no reflection at the light extracting patterns 350 and a portion of the reflected light satisfying the condition of total reflection keeps propagating inside the LGP 330 and contributes to illumination of other key buttons.

As light inside the LGP 330 propagates from the first lateral surface, which is adjacent to the light source 390, to the second lateral surface while undergoing attenuation, the distribution of luminance appearing over the keypad assembly 300 may gradually weaken from the first lateral surface of the LGP 330 to its second lateral surface. In order to avoid such unevenness of luminance, it is possible to gradually increase the density of the light extracting patterns 350 from the first lateral surface of the LGP 330 to its second lateral surface while the overall pattern size remains the same. Such a change of density of the light extracting patterns 350 may be made by varying the number of components or by modifying the size of components or of the entire patterns. The density of the light extracting patterns 350 is defined as the area occupied by the light extracting patterns 350 per unit area. Alternatively, the size of the light extracting patterns 350 may gradually increase from the first lateral surface of the LGP 330 to its second lateral surface. When the light extracting patterns 350 are V-shaped elements, their density may be defined as the peak interval of the V-shaped elements while the overall pattern and element sizes remains the same, and the peak interval may gradually decrease from the first lateral surface of the LGP 330 to its second lateral surface. When the peak interval is gradually decrease, the density of the light extracting patterns 350 is gradually increased.

The switch board 360 includes a PCB 380 and a dome sheet 370.

The PCB 380 has a plurality of conductive contact members 382 formed on its upper surface. Each contact member 382 and a corresponding dome 372 constitute a switch as a whole. Each switch 382 and 372 is aligned with a corresponding key button 324 in the transverse direction of the keypad assembly 300.

The dome sheet 370 is attached to the upper surface of the PCB 380, and has a plurality of conductive domes 372 having a semi-spherical shape. Each dome 372 completely covers the corresponding contact member 382.

When the user presses one of the key buttons 324, a portion of the keypad 310 lying beneath the pressed key button 324 is deformed towards the switch board 360 and a protrusion 340 belonging to the deformed portion compresses the corresponding dome 372. As a result, the compressed dome 372 establishes an electric contact with the corresponding contact member 382. Consequently, the switch is turned on. By sensing a key signal resulting from the electric contact, the user's pressing of the key button 324 is detected.

When the protrusions 340 are made of rubber, the domes 372 easily attach to the protrusions 340 due to their sticky surface. Therefore, the surface of respective domes 372 may either be roughened or coated with a releasing agent so that it is easily detached from the protrusion 340. According to an alternative embodiment, the protrusions 340 are not formed on the LGP 330, but are attached to the upper end of the domes 372.

Figure 4:
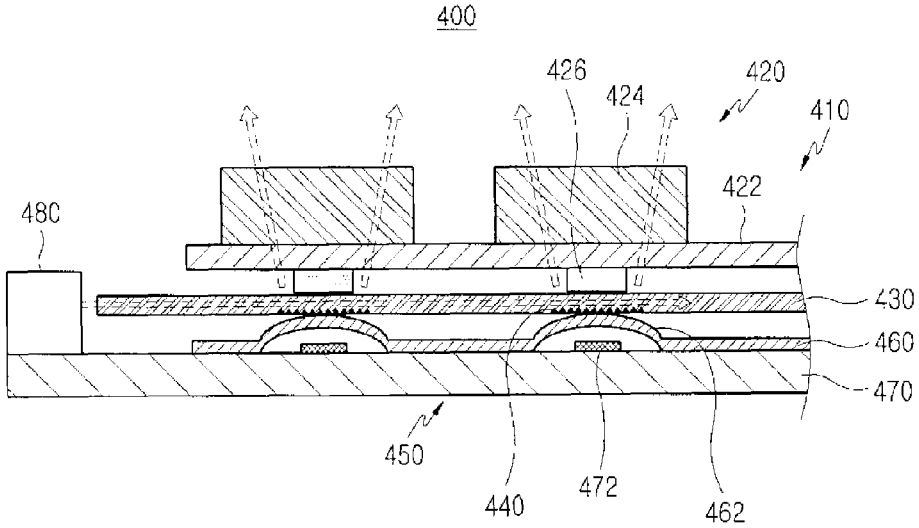
FIG. 4 shows the construction of a keypad assembly according to a second exemplary embodiment of the present invention.

FIG. 4 shows the construction of a keypad assembly according to a second exemplary embodiment of the present invention. The keypad assembly 400 includes a keypad 410, a switch board 450, and at least one light source 480. The keypad 410 includes a key sheet 420 and an LGP 430. The key sheet 420 includes a film 422, a plurality of key buttons 424, and a plurality of protrusions 426. The LGP 430 includes a plurality of light extracting patterns 440. The construction of the keypad assembly 400 is similar to that of the keypad assembly 300 shown in FIG. 3, except for the position of the protrusions 426 and the installation type of the LGP 430. Therefore, repeated descriptions will be omitted herein for clarity.

The film 422 may have any shape (e.g. square plate), and has a plurality of key buttons 424 positioned on its upper surface and a plurality of protrusions 426 positioned on its lower surface. The film 422 has elasticity so that, when the key buttons 424 are pressed by the user, they can return to their original position. In other words, the self-restoring properties of the film 422 guarantees that the key buttons 424 substantially regain their original shapes after being deformed.

The key buttons 424 are positioned on the upper surface of the film 422. Particularly, the key buttons 424 may be attached to the upper surface of the film 422 by an adhesive. Alternatively, the key buttons 424 may be formed as an integral unit with the film 422 through injection molding, for example.

The protrusions 426 are formed on the lower surface of the film 422.

The LGP 430 may have any shape (e.g. square plate), and is interposed between the key sheet 420 and the switch board 450.

The light source 480 is mounted on the upper surface of the PCB 470 in such a manner that its light emitting surface faces the first lateral surface of the LGP 430. Light emitted by the light source 480 is coupled to the inside of the LGP 430 via its first lateral surface.

The LGP 430 guides light from the first lateral surface of the LGP 430 to its second lateral surface lying opposite the first lateral surface. As used herein, the first lateral surface of the LGP 430 refers to one of lateral surfaces to which light from the light source 480 is coupled. The LGP 430 has elasticity (i.e. self-restoring properties) so that, after being deformed by an operation of the key buttons 424, it can regain its original shape.

The LGP 430 has a plurality of light extracting patterns 440 for extracting a portion of light that propagates inside the LGP 430, and then out of the LGP 430 so that the light is incident on corresponding key buttons 424. Respective light extracting patterns 440 are aligned with corresponding key buttons 424 in the transverse direction of the keypad assembly 400. The light extracting patterns 440 may be formed on the upper surface of the LGP 430 instead of its lower surface.

Each light extraction pattern 440 extracts a portion of light that propagates inside the LGP 430 and out of the LGP 430 so that the light is incident on the corresponding key button 424. When the light extracting patterns 440 are formed on the lower surface of the LGP 430, as shown, they reflect at least a portion of incident light towards the corresponding key buttons 424. The light extracting patterns 440 may be formed on the upper surface of the LGP 430. In this case, the light extracting patterns 440 scatter and transmit incident light towards corresponding key buttons 424.

The switch board 450 includes a PCB 470 and a dome sheet 460.

The PCB 470 has a plurality of conductive contact members 472 formed on its upper surface. Each contact member 472 and a corresponding dome 462 constitute a switch as a whole. Each switch 462 and 472 is aligned with a corresponding key button 424 in the transverse direction of the keypad assembly 400.

The dome sheet 460 is attached to the upper surface of the PCB 470, and has a plurality of conductive domes 462 having a semi-spherical shape. Each dome 462 completely covers the corresponding contact member 472.

When the user presses one of the key buttons 424, a portion of the keypad 410 lying beneath the pressed key button 424 is deformed towards the switch board 450. Then, a protrusion 426 belonging to the deformed portion compresses the corresponding dome 462 via the LGP 430. As a result, the compressed dome 462 establishes an electric contact with the corresponding contact member 472. Consequently, the switch is turned on.

In the case of the above-mentioned first and second embodiments of the present invention, the luminance necessary to illuminate the key pad assembly is affected by the thickness of the LGP, the distance between the light source and the LGP, the luminance of the light source, the shape, size, and interval of the light extracting patterns, the printing type of the key buttons, and the refractive index of the LGP. Among them, the thickness of the LGP and the distance between the light source and the LGP play a crucial role.

The determination of range of thickness of the LGP 430 and that of distance between the light source 480 and the LGP 430 for the purpose of obtaining desired luminance will now be described with regard to the second embodiment of the present invention. The same description is applicable to the first embodiment of the present invention.

The following values are given prior to determining the thickness of the LGP 430 and the distance between the light source 480 and the LGP 430, because they hardly affect the luminance for illumination and can be selected according to design requirements.

The light extracting patterns 440 consist of a plurality of semi-spherical elements, each of which has a diameter in the range of 0.03 mm, and the interval between them is in the range of 0.06 mm. Although various types of members may constitute the light extracting patterns 440, semi-spherical elements are preferred because they can be easily formed by thermal compression or laser etching, which is inexpensive.

The key buttons 424 may be printed with white or gray ink, and may have a thickness in the range of 0.2-2 mm. Preferably, the key buttons 424 are printed with white ink, and have a thickness of 0.2 mm.

The light source 480 may have a luminance between 1200 and 1600 milli-candles (mcd), an emission angle in the range of 100-130°, and a thickness in the range of 0.4-0.6 mm. Preferably, the light source 480 has a luminance of 1400 mcd, an emission angle of 120°, and a thickness of 0.6 mm. It is assumed that the thickness of the light source 480 is equal to the height of its light emitting surface. If they are not the same, the latter is regarded as the reference. The light source 480 and the LGP 430 are aligned with each other in such a manner that their centers coincide with each other in the transverse direction.

The LGP 430 may have a refractive index in the range of 1.4-1.6, and preferably has a refractive index of 1.58, i.e., the same as polycarbonate.

Figure 5:
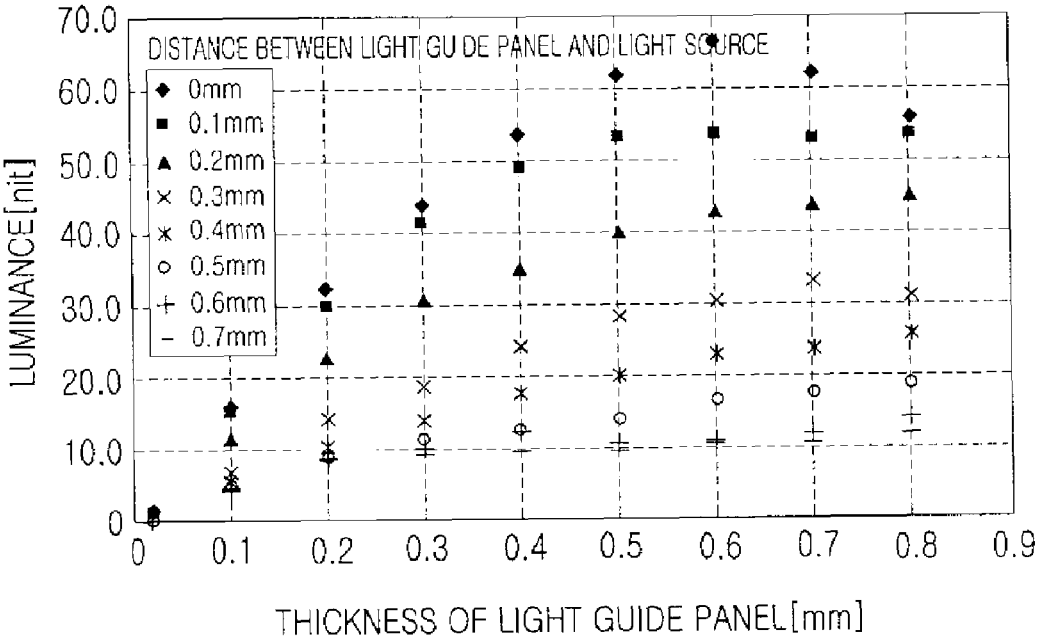
FIG. 5 is a graph showing the relationship among the thickness of an LGP, the distance between a light source and the LGP, and the luminance for illumination.

FIG. 5 is a graph showing the relationship among the thickness of the LGP 430, the distance between the light source 480 and the LGP 430, and the luminance for illumination. It is clear from the graph that the luminance for illumination is proportional to the thickness of the LGP 430, but is inversely proportional to the distance between the light source 480 and the LGP 430.

Figure 6:
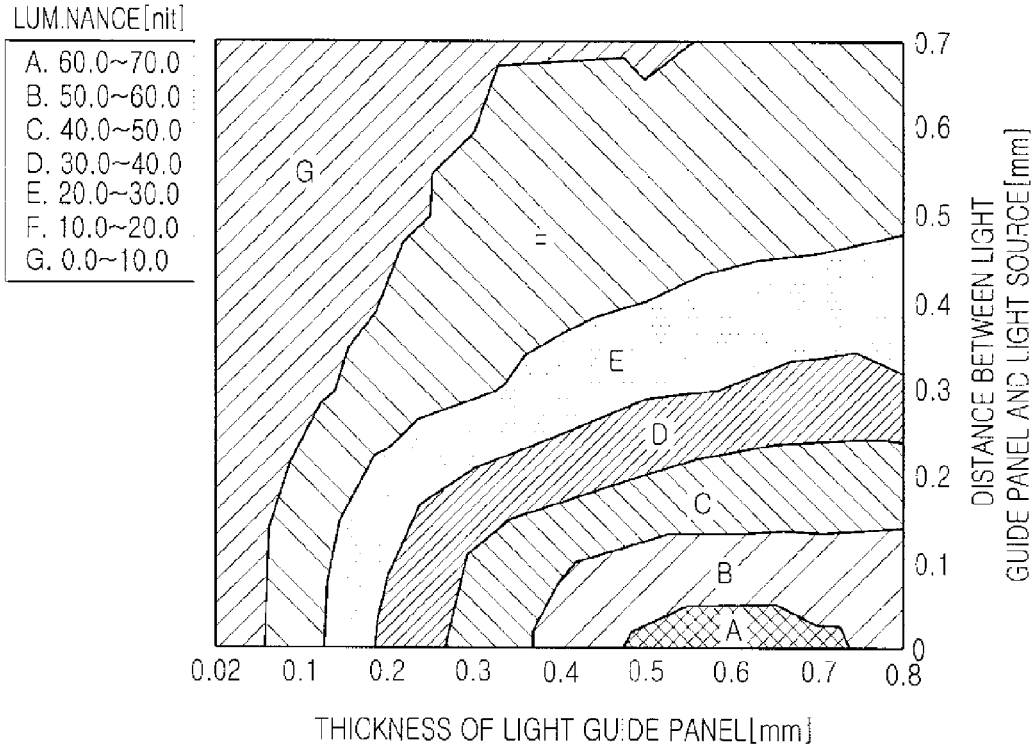
FIG. 6 is a contour map showing the relationship among the thickness of an LGP, the distance between a light source and the LGP, and the luminance for illumination.

FIG. 6 is a contour map showing the relationship among the thickness of the LGP 430, the distance between the light source 480 and the LGP 430, and the luminance for illumination. It is clear from the graph that, as the luminance for illumination increases, the margin given to combine the thickness of the LGP 430 and the distance between the light source 480 and the LGP 430 becomes narrower.

Figure 1:
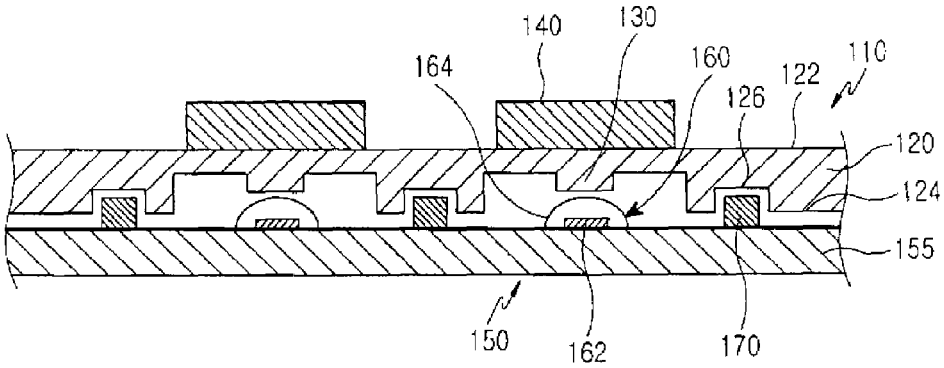
FIG.1 (PRIOR ART)
FIG. 1 is a sectional view of a first exemplary keypad assembly according to the prior art.
Figure 2:
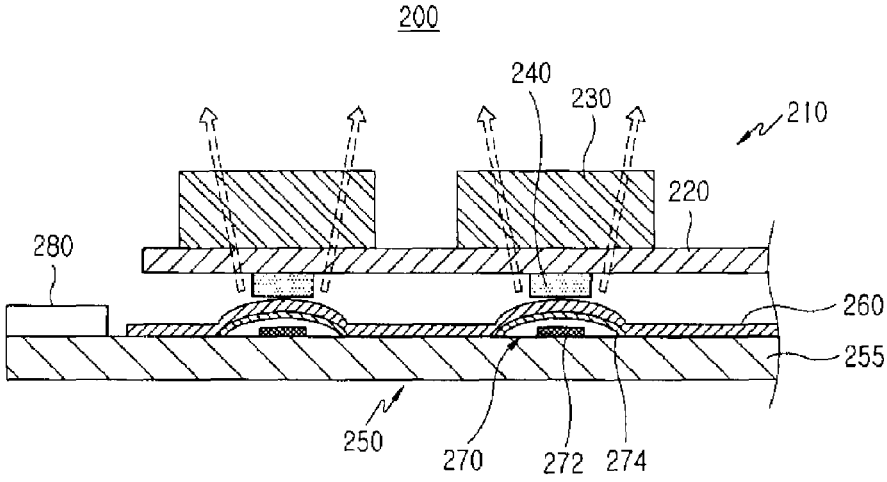
FIG.2 (PRIOR ART)
FIG. 2 is a sectional view of a second exemplary keypad assembly according to the prior art.

Considering that the luminance for illumination is inversely proportional to the distance between the LGP 430 and the light source 480, the lower limit of the distance may be set to be zero. However, reduction of the distance requires very sophisticated alignment between the light source 480 and the LGP 430, and increases the manufacturing cost and time. Therefore, the distance is preferably as large as possible while the lower limit of the luminance for illumination is guaranteed. The lower limit of the luminance for illumination is commonly 1 nit (note 1 nit=1 cd/m$^2$). This value is conventionally proposed in the industry with regard to a keypad assembly 200 employing an electroluminescence sheet 260 as shown in FIG. 2. It is guaranteed that, when the distance between the LGP 430 and the light source 480 is about 0.7 mm, the lower limit of the luminance for illumination is at least 1 nit, as is clear from FIG. 5. The maximum tolerance commonly allowed by the manufacturers of keypad assemblies is in the order of 0.5 mm. This means that, if the distance is about 0.75 mm, the lower limit of the luminance for illumination is guaranteed while minimizing the defective ratio during processes. For example, considering a position tolerance occurring in a process for mounting the light source 480 on the PCB 470, a tolerance occurring in a process for cutting the LGP 430, and a tolerance occurring in a process for aligning the LGP 430 with the light source 480, the maximum tolerance is in the order of 0.5 mm. A luminance of at least 1 nit is guaranteed at a distance of 0.75 mm, as mentioned above, making the upper limit of the distance 0.75 mm. Therefore, the distance between the LGP 430 and the light source 480 is limited to a range of 0-0.75 mm, which maximizes the luminance for illumination and minimizes the defective ratio during manufacturing processes, and a range of 0-0.5 mm is preferred.

Although the luminance for illumination increases in proportion to the thickness of the LGP 430, as shown in FIG. 5, the thickness must be limited because otherwise the overall thickness of the keypad assembly 400 increases. If the thickness of the LGP 430 exceeds a threshold, the increase in luminance becomes less steep. This means that, if the threshold is exceeded, the thickness of the keypad assembly 400 increases with little improvement in the luminance for illumination. In summary, the thickness of the LGP 430 must be limited properly. Referring to FIG. 5, the increase in luminance is hardly noticeable when the thickness of the LGP 430 reaches a size in the range of 0.4-0.6 mm. The luminance for illumination even decreases if the thickness of the LGP 430 is larger than a known value. For example, if the thickness of the LGP 430 exceeds 0.6 mm when the distance between the LGP 430 and the light source 480 is zero, and the luminance decreases. This is because the optical coupling efficiency becomes constant while the optical loss increases. This means that the thickness of the LGP 430 is not necessarily larger than that of the employed light source 480.

Having described the relationship between the light source 480 and the LGP 430, clicking sensitivity, which is affected by the thickness of the LGP 430, will now be described.

As mentioned above, the switches 462 and 472 work as the key buttons 424 are operated. The LGP 430, which is positioned between the switches 462 and 472 and the key buttons 424, must have elasticity so that it can be easily deformed and restored as the key buttons 424 are operated. Such performance of the key buttons 424, i.e. how easily the key buttons 424 can be pressed, is referred to as clicking sensitivity. Clicking sensitivity is affected by the material and thickness of the LGP 430.

Figure 7:
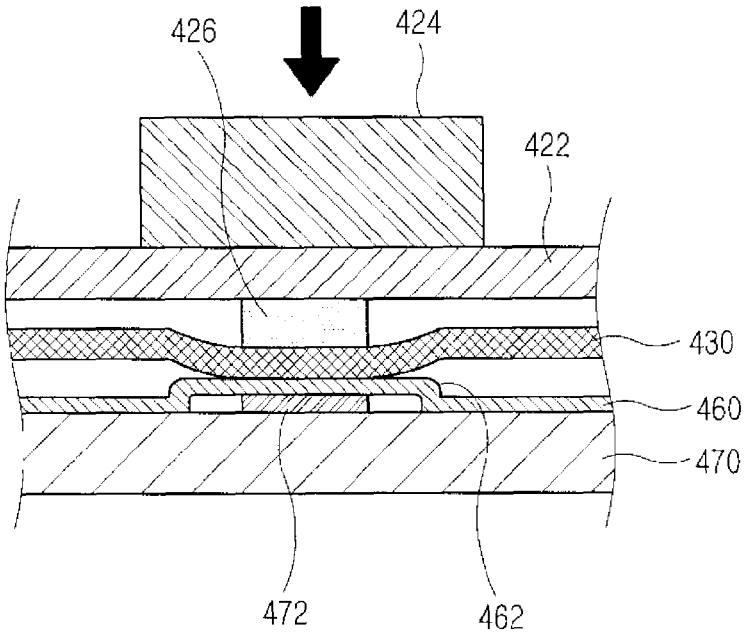
FIG. 7 illustrates how a switch works when a key button is operated.
Figure 8:
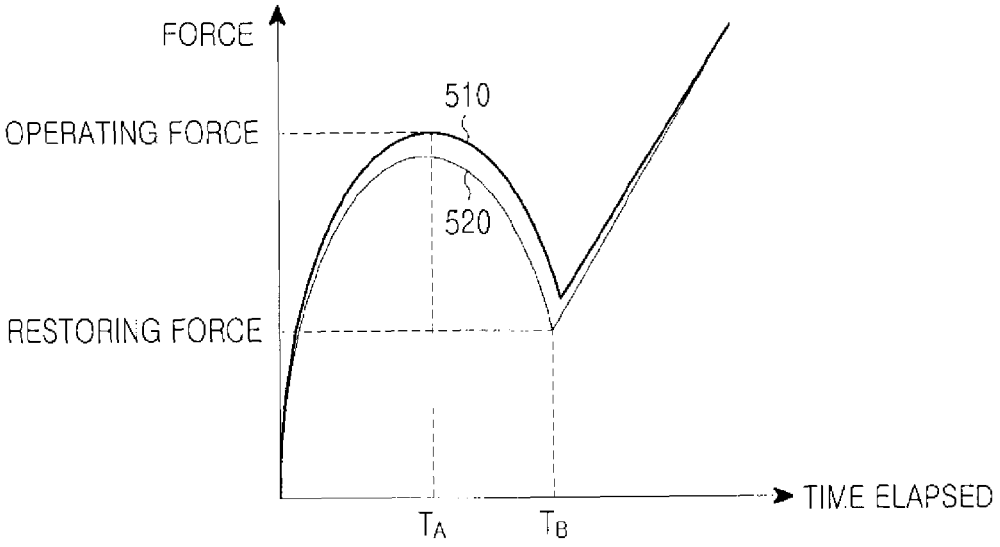
FIG. 8 is a graph showing pressure applied to a key button and repulsive force transmitted to the key button.

FIG. 7 illustrates how a switch 462 and 472 works when a key button 424 is operated, and FIG. 8 is a graph showing a curve 510 of pressure applied to the key button 424 and a curve 520 of repulsive force transmitted to the key button 424.

An operation of the key button 424 (i.e. when the user presses the key button 424) deforms the corresponding portion of the key sheet 420 downwards and a protrusion 426 aligned with the key button 424 compresses the LGP 430. The resulting pressure deforms the LGP 430 downwards, and a dome 462 aligned with the key button 424 is deformed downwards. Such deformation continues until the dome 462, which is forced against the contact member 472, cannot deform any more ($T_B$). If the user removes his/her hand from the key button 424 after that time, force is applied to the key button 424. This corresponds to the inverse of the change of pressure in terms of the axis of time shown in FIG. 8.

Referring to FIG. 8, pressure applied to the key button 424 by the user increases non-linearly in section 0-$T_A$, decreases in section $T_A$-$T_B$, and increases linearly in a section after $T_B$. The linear increase of pressure in the section after $T_B$ means that the user continuously applies pressure to the key button 424.

In FIG. 8, the maximum pressure applied to the key button 424 in section 0-$T_B$ is referred to as operating force, and the repulsive force at $T_B$ is referred to as a restoring force. The clicking sensitivity is commonly described in terms of the ratio between the operating force and the restoring force. The higher the clicking sensitivity is, the more clearly and easily the user recognizes that a click has been conducted. The operating force and restoring force are related to the bending strength of the LGP 430. That is, the higher the bending strength of the LGP 430 is, the more difficult it is to deform the LGP 430. In other words, the user must apply more force to click the key button 424.

Following Table 1 compares the operating force with the clicking sensitivity in the case of variously constructed keypad assemblies.

TABLE 1

| | Operating force (gf) | Clicking sensitivity (%) |
|---|---|---|
| Dome sheet | 177.80 | 45.86 |
| Constructed as shown in FIG. 2 | 191.20 | 36.98 |
| Constructed as shown in FIG. 4 (125 μm) | 189.04 | 40.91 |
| Constructed as shown in FIG. 4 (178 μm) | 204.36 | 32.28 |

In Table 1, comparisons are made when a polycarbonate LGP 430 has a thickness of 125 μm and 178 μm.

It is clear from the table that, when the LGP 430 is employed, the clicking sensitivity is inversely proportional to the thickness of the LGP 430. Experiments also confirm that good clicking sensitivity is maintained if the thickness of the LGP 40 is equal to or smaller than 0.3 mm. In summary, when the LGP 430 is made of polycarbonate, the upper limit of its thickness is preferably limited to 0.3 mm, considering the clicking sensitivity.

In the case of PMMA, the bending strength of which is higher than that of the polycarbonate, good clicking sensitivity is maintained at a smaller thickness (experimentally, when the thickness is equal to or smaller than 0.2 mm).

Rubber-based materials (e.g. silicone and polyurethane) have a bending strength tens or hundreds times higher than that of plastic-based materials (e.g. polycarbonate and PMMA). This means that, in the case of the rubber-based materials, good clicking sensitivity is maintained even if the thickness is very large. However, if the thickness of the light source 480 is excessive, the luminance for illumination hardly increases, as mentioned above, which is undesirable. Furthermore, the center of the light source 480 may fail to coincide with that of the LGP 430 if the thickness of the light source 480 is excessive (in this case, the luminance decreases). Therefore, the maximum thickness of the LGP 430 is limited to 0.6 mm with regard to the above-mentioned materials. The minimum thickness of the LGP 430 is limited by the luminance for illumination. Particularly, the thinner the LGP 430 is, the lower the optical coupling efficiency becomes. This degrades the luminance for illumination. In this regard, the thickness is limited to guarantee at least a reference luminance, which is commonly 1 nit if the characters on the key buttons are to be recognized. This corresponds to the reference luminance required for the keypad assembly 200 employing an electroluminescence sheet 260 shown in FIG. 2.

In one aspect, in order to guarantee the reference luminance, the minimum thickness of the LGP 430 must be about 0.03 mm.

In summary, the range of thickness of the LGP 430 for providing good clicking sensitivity and guaranteeing the reference luminance is 0.03-0.6 mm in the case of rubber-based materials (e.g. silicone and polyurethane), and 0.03-0.2 mm in the case of plastic-based materials (e.g. polycarbonate and PMMA). These ranges are based on the consideration that it is difficult and expensive to manufacture a very thin LGP 430.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A keypad assembly comprising:

a light guide panel made of a rubber-based material and having a thickness of 0.3-0.4 mm;

at least one light extracting pattern provided on the light guide panel so that light propagating inside the light guide panel is directed out of the light guide panel;

a switch board having at least one switch; and at least one light source for coupling light to the inside of the light guide panel.

2. The keypad assembly as claimed in claim 1, wherein a distance between the light guide panel and the light source is equal to or smaller than 0.75 mm.

3. The keypad assembly as claimed in claim 2, wherein the distance between the light guide panel and the light source is equal to or smaller than 0.5 mm.

4. The keypad assembly as claimed in claim 1, further comprising:

a key sheet having at least one key button and a film, the at least one key button formed on an upper surface of the film.

5. The keypad assembly as claimed in claim 4, wherein an air layer is maintained between, the film and the light guide panel.

6. The keypad assembly as claimed in claim 4, wherein the film is attached to an upper surface of the light guide panel.

7. The keypad assembly as claimed in claim 1, wherein the light guide panel has at least one protrusion formed on a lower surface of the light guide panel.

8. The keypad assembly as claimed in claim 7, wherein the light extracting pattern is formed on the lower surface of the light guide panel around the protrusion.

9. The keypad assembly as claimed in claim 1, wherein a peripheral portion of the light guide panel bends and extends to an upper surface of the switch board.

10. The keypad assembly as claimed in claim 1, wherein the light guide panel is adapted to regain an original shape after being deformed by external pressure.

11. The keypad assembly as claimed in claim 4, wherein the key sheet has at least one protrusion formed on a lower surface of the film.

12. The keypad assembly as claimed in claim 8, wherein a density of said light extracting pattern increases in the direction of light propagating through the light guide panel.

13. The keypad assembly as claimed in claim 8, wherein elements of said light extracting pattern are in a V-shape.

14. The keypad assembly as claimed in claim 1, wherein said light source provides a luminance between 1200 and 1600 mcd.

15. A keypad assembly comprising:

a light guide panel made of a rubber-based material and having a thickness of 0.3-0.4 mm;

at least one light extracting pattern composed of a plurality of V-shaped elements on the light guide panel, wherein the density of the light extracting pattern increases in the direction of the light propagating inside the light guide;

a switch board having at least one switch; and at least one light source for coupling light to the inside of the light guide panel.

16. The keypad assembly as claimed in claim 15, wherein the light guide panel is composed of a material having a self-restoring property when, deformed.

17. The keypad assembly as claimed in claim 15, wherein a distance between the light guide panel and the light source is equal to or smaller than 0.75 mm.

18. The keypad assembly as claimed in claim 1, wherein the light source is positioned on the switch board and a peripheral portion of the light guide panel extends to the light source.

19. The keypad assembly as claimed in claim 15, further comprising:

a key sheet having at least one key button and a film, the at least one key button formed on, an upper surface of the film, wherein the film is attached to the light guide panel such that an air layer is maintained between the film and the light guide panel.

*20. A keypad assembly comprising:*

*a light guide plate made of polycarbonate and having a thickness of 0.03 mm-0.2 mm;*

*at least one light extracting pattern provided on the light guide plate so that light propagating inside the light guide plate is directed out of the light guide plate;*

*a switch board having at least one switch; and*

*at least one light source for coupling light to the inside of the light guide plate.*

*21. The keypad assembly as claimed in claim 20, further comprising: a key sheet having at least one key button and a film, the at least one key button formed on an upper surface of the film.*

*22. The keypad assembly as claimed in claim 21, wherein an air layer is maintained between the film and the light guide plate.*

*23. The keypad assembly as claimed in claim 20, further comprising at least one protrusion positioned between the light guide plate and the switch.*

*24. The keypad assembly as claimed in claim 21, wherein the light extracting pattern is formed on the light guide plate and corresponds to the key button.*

*25. The keypad assembly as claimed in claim 24, wherein a density of said light extracting pattern increases in the direction of light propagating through the light guide plate.*

*26. A keypad assembly comprising:*

*a light guide plate made of polyurethane and having a thickness of 0.03 mm-0.2 mm;*

*at least one light extracting pattern provided on the light guide plate so that light propagating inside the light guide plate is directed out of the light guide plate;*

*a switch board having at least one switch; and*

*at least one light source for coupling light to the inside of the light guide plate.*

*27. A keypad assembly comprising:*

*a light guide plate made of polymethylmethacrylate (PMMA) and having a thickness of 0.03 mm-0.2 mm;*

*at least one light extracting pattern provided on the light guide plate so that light propagating inside the light guide plate is directed out of the light guide plate;*

*a switch board having at least one switch; and*

*at least one light source for coupling light to the inside of the light guide plate.*

* * * * *

UNITED STATES PATENT AND TRADEMARK OFFICE

CERTIFICATE OF CORRECTION

PATENT NO. : RE44,974 E
APPLICATION NO. : 13/670756
DATED : July 1, 2014
INVENTOR(S) : Yu-Sheop Lee et al.

It is certified that error appears in the above-identified patent and that said Letters Patent is hereby corrected as shown below:

In the Claims

Column 12, Claim 16, Line 5 should read as follows:
--...self-restoring property when deformed...--

Signed and Sealed this
Second Day of September, 2014

Michelle K. Lee

Michelle K. Lee
*Deputy Director of the United States Patent and Trademark Office*